US007344080B2

(12) United States Patent
Vinogradov et al.

(10) Patent No.: US 7,344,080 B2
(45) Date of Patent: Mar. 18, 2008

(54) IMAGING-BASED BAR CODE READER UTILIZING STITCHING METHOD AND SWIPE GUIDE

(75) Inventors: Igor R. Vinogradov, New York, NY (US); Miroslav Trajkovic, Coram, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/395,569

(22) Filed: Mar. 31, 2006

(65) Prior Publication Data

US 2007/0228174 A1  Oct. 4, 2007

(51) Int. Cl.
*G06K 7/10* (2006.01)
(52) U.S. Cl. ............................ 235/462.11; 235/462.12; 235/462.43; 235/485
(58) Field of Classification Search ..............................
235/492.09–462.12, 482–483, 485, 462.41, 235/454, 462.14
See application file for complete search history.

(56) References Cited

U.S. PATENT DOCUMENTS

| | | | | |
|---|---|---|---|---|
| 5,384,452 | A | * | 1/1995 | He .......................... 235/462.12 |
| 5,444,230 | A | * | 8/1995 | Baldwin et al. ....... 235/462.42 |
| 5,729,003 | A | * | 3/1998 | Briggs, III ............. 235/462.07 |
| 5,821,519 | A | | 10/1998 | Lee et al. |
| 5,912,452 | A | * | 6/1999 | Wiklof et al. .......... 235/472.01 |

2004/0169082 A1 * 9/2004 Lebaschi et al. ....... 235/462.12

OTHER PUBLICATIONS

Gusfield, Dan, *Algorithms on Strings, Trees, and Sequences Computer Science and Computional Biology*, published by The Press Syndicate of The University of Cambridge, copyright 1997 (Reprinted 1999) ISBN #0-521-58519-8 (HC) (9 Pages including title pages, table of contents and preface) (If the Examiner wishes to review the above-identified book or any specific sections of the book, an original copy of the book will be provided to the Examiner upon request.).
Michal Irani and Shmuel Peleg, "Super Resolution From Image Sequences," Department of Computer Science, The Hebrew University of Jerusalem 91904, Jerusalem, Israel, published in International Conference on Pattern Recognition, 1990, CH 2898-5/90/0000/0115$01.00 copyright 1990 IEEE (6 Pages).

* cited by examiner

*Primary Examiner*—Michael G. Lee
*Assistant Examiner*—Carol Hesse
(74) *Attorney, Agent, or Firm*—Tarolli, Sundheim, Covell & Tummino LLP

(57) ABSTRACT

An imaging-based bar code reader that includes an item guide to guide movement of an item including a target bar code such that target bar code passes through a field of view of the reader in a straight line. The reader further includes an imaging and decoding system to: 1) capture a series of images which include at least a part of the target bar code as the bar code is moved through the field of view of the reader; 2) sequentially analyze the series of captured images, for each captured image, identifying areas of the captured image representative of an image of the target bar code and decode decodable portions of the imaged target bar code; and 3) combining the decoded portions of the imaged target bar code using a sequence stitching method to obtain a full decode of the target bar code.

21 Claims, 6 Drawing Sheets

IMAGING-BASED BAR CODE READER UTILIZING STITCHING METHOD AND SWIPE GUIDE

FIELD OF THE INVENTION

The present invention relates to an imaging-based bar code reader and, more particularly, to a hands-free bar code reader that facilitates reading of high density bar codes by utilizing an sequence stitching method and by providing an item swipe guide to provide straight line movement of the bar code as it moves though a field of view of the reader.

BACKGROUND OF THE INVENTION

Various electro-optical systems have been developed for reading optical indicia, such as bar codes. A bar code is a coded pattern of graphical indicia comprised of a series of bars and spaces having differing light reflecting characteristics. The pattern of the bars and spaces encode information. In certain bar codes, there is a single row of bars and spaces, typically of varying widths. Such bar codes are referred to as one dimensional (1D) bar codes. Other bar codes include multiple rows of bars and spaces, each row typically having the same width. Such bar codes are referred to as two dimensional (2D) bar codes and examples include PDF417 and DataMatrix bar code formats. By virtue of the use of multiple rows of features (bars and spaces), 2D bar codes typically allow more encoded information than a 1D bar code in a given bar code area. Devices that read and decode one and two dimensional bar codes utilizing imaging systems that image and decode imaged bar codes are typically referred to as imaging-based bar code readers or bar code scanners.

Imaging systems include charge coupled device (CCD) arrays, complementary metal oxide semiconductor (CMOS) arrays, or other imaging pixel arrays having a plurality of photosensitive elements or pixels. An illumination system comprising light emitting diodes (LEDs) or other light source directs illumination toward a target object, e.g., a target bar code. Light reflected from the target bar code is focused through a lens of the imaging system onto the pixel array. Thus, an image of a field of view of the focusing lens is focused on the pixel array. Periodically, the pixels of the array are sequentially read out generating an analog signal representative of a captured image frame. The analog signal is amplified by a gain factor and the amplified analog signal is digitized by an analog-to-digital converter. Decoding circuitry of the imaging system processes the digitized signals and attempts to decode the imaged bar code.

A continuing trend in bar code technology is increasing density of bar codes, that is, encoding more information in a given bar code area. For many items, the available area where a bar code may be imprinted is limited. Thus, if more information is desired to be encoded in a bar code, bar code density must be increased, hence the trend from 1D to 2D bar codes. Increasing the density of a 2D bar code requires increasing the number of bar code features (bars or stripes) in a given area. However, deceasing feature size leads to problems in imaging resolution and decoding of high density 2D bar codes, such at PDF 417 and DataMatrix bar codes which utilize very small feature size.

What is desired is an imaging-based bar code reader that provides for effective reading of high density 2D bar codes.

SUMMARY OF THE INVENTION

The present invention concerns an imaging-based bar code reader that includes an item guide to guide movement of an item including a target bar code such that target bar code passes through a field of view of the reader in a straight line and further including an imaging and decoding system to: 1) capture a series of images which include at least a part of the target bar code as the bar code is moved through the field of view of the reader; 2) sequentially analyze the series of captured images, for each captured image, identify areas of the captured image representative of an image of the target bar code and decode decodable portions of the imaged target bar code; and 3) utilize an sequence combining or stitching method to combine the decoded portions of the imaged target bar code to obtain a full decode of the target bar code.

The item swipe guide that directs movement of the target bar code through the reader field of view in a straight line path such that relative positions of the imaged target bar code with respect to captured images of the series of captured images are linearly aligned along an axis corresponding to movement of the item with respect to the item guide. The linear alignment of the imaged target bar code positions within the series of captured images enhances the capability of the imaging and decoding system to identify and decode decodable portions of the imaged target bar code.

These and other objects, advantages, and features of the exemplary embodiment of the invention are described in detail in conjunction with the accompanying drawings.

DETAILED DESCRIPTION

Figure 1:
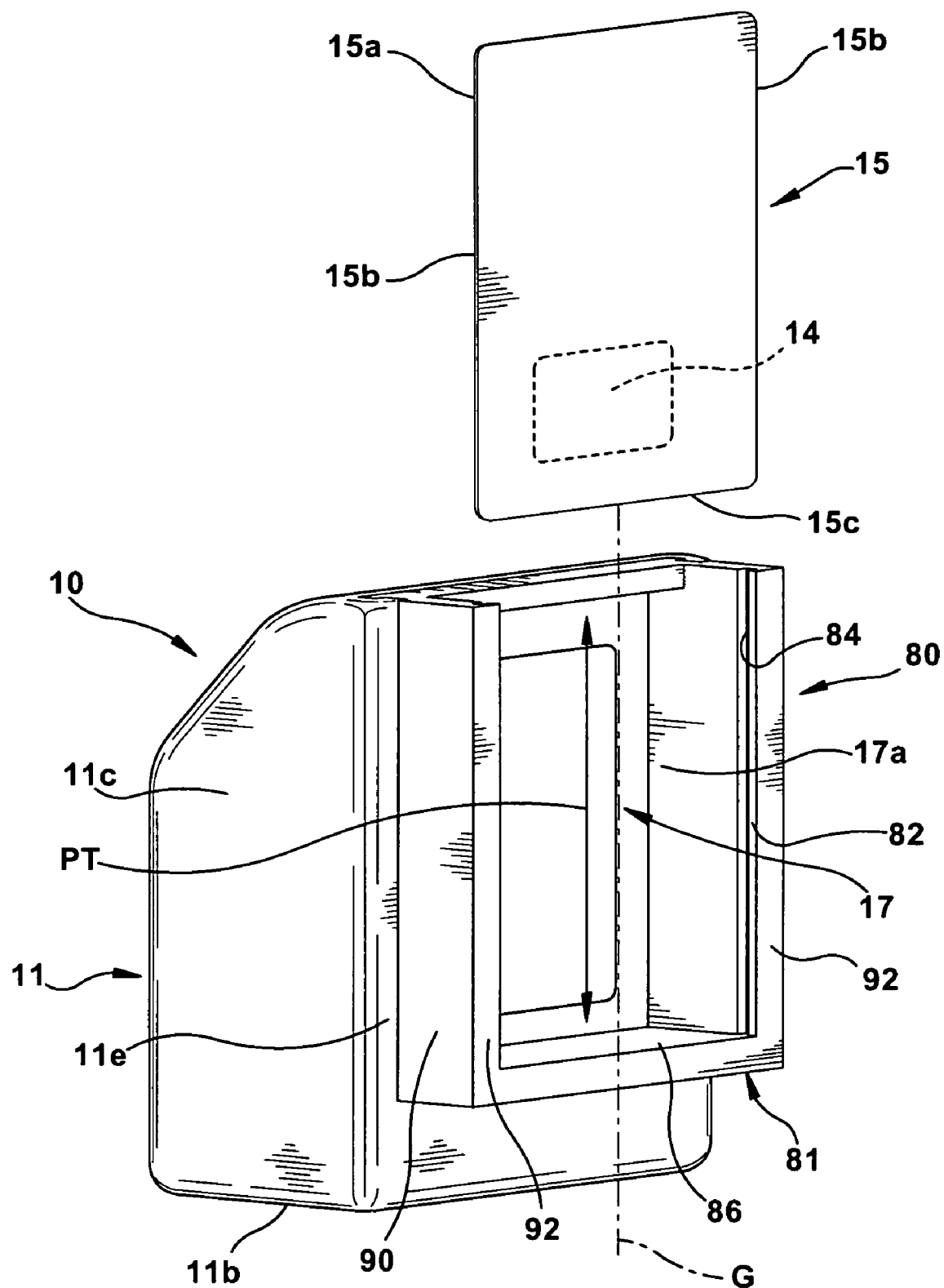
FIG. 1 is a schematic perspective view of an imaging-based bar code reader of the present invention including an item swipe guide.
Figure 2:
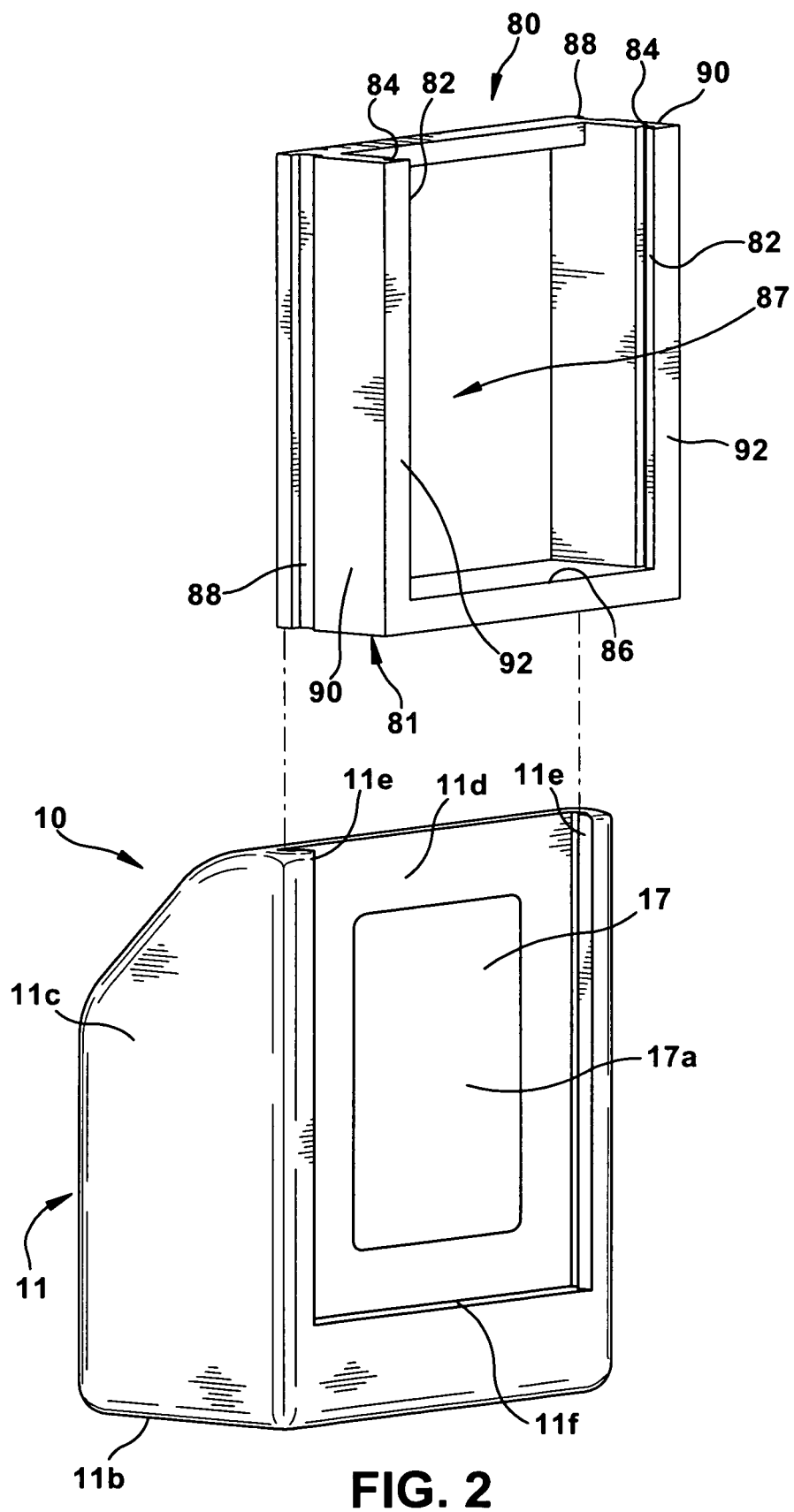
FIG. 2 is a schematic perspective view of the imaging-based bar code reader of FIG. 1 with the guide removed.

An imaging-based reader, such as an imaging-based bar code reader, is shown schematically at 10 in FIGS. 1-4. The bar code reader 10 is capable of imaging and decoding both 1D and 2D bar codes, such as a 2D bar code shown at 14, utilizing a sequence stitching method, as explained below. Additionally, the reader 10 is also capable of capturing images and signatures. The bar code reader 10 includes a housing 11 supporting an imaging system 10 and a decoding system 40 within an interior region 11a of the housing 11. The housing 11 supports a transparent window 17 through which reflected illumination from the target bar code 14 is received by the imaging system 10.

The bar code reader 10 includes an imaging system 20 and a decoding system 40. The imaging system 20, when enabled, during an exposure period, captures an image frame 42 of a field of view FV of the imaging system. During an imaging session to read a target bar code 14, the imaging process is repeated to capture a series of image frames 43 as the target bar code 14 is moved through the imaging system field of view FV. Each of the series of captured image frames 43 includes at least a portion of an image 14' of the target bar code. The decoding system 40 sequentially analyzes each image frame 42 of the series of image frames 43 and attempts to decode decodable portions of the imaged bar code 14'. The decoded portions 14a' of the imaged bar code 14' are stored in a buffer memory 44a.

Utilizing a sequence stitching method, each time a decoded portion 14a' is stored in the buffer memory 44a, the decoding system 40 attempts to combine or stitch the decoded portions 14a' stored in buffer memory to achieve a full decode of the target bar code 14. The sequential analysis, partial decoding and stitching of decoded portions of the imaged bar code 14' continues until a full decode of the target bar code 14 is achieved. Further, the reader 10 of the present invention includes an item guide 80 which directs movement of an item 15 to which the target bar code 14 is affixed such that the target bar code moves through the field of view FV along a linear travel path.

The reader 10 has enhanced capability of successfully reading high density 2D bar codes where successful reading is limited by PPM (pixels per module) constraints. PPM is a measure of how many active pixels of a sensor array the smallest feature (bar or stripe) of a bar code is imaged onto. For a given sized sensor array, the higher the density of a bar code, the lower the PPM and as PPM decreases the capability of the imaging system to obtain an image that permits complete decoding of the bar code also decreases. By obtaining partial decodes of the imaged bar code 14 appearing in successive capture images 43 and then combining those partial decodes until a full decode is achieved, the reader 10 of the present invention overcomes the need for obtaining a single image that allows a full decoding and thereby enjoys enhanced high density reading capability.

This high density reading capability of the reader 10 is further enhanced by the item guide 80 which, as will be explained below, provides that a relative position of the image 14' of the target bar code 14' within each of the series of captured images 43 is linearly aligned with respect to each other and parallel with an axis of movement G defined by the item guide 80, that is, the axis corresponding to a path of travel PT of the item 15 in or on the guide 80. The linear alignment of the position of the imaged target bar code 14' leads to more robust and efficient decoding of the imaged target bar code 14'.

The imaging system 20 comprises and an imaging camera assembly 22 and associated imaging circuitry 24. The imaging camera 22 includes a housing 25 supporting focusing optics including a focusing lens 26 and a 2D photosensor or pixel array 28. The imaging camera 22 is enabled during an imaging session to capture a sequence of images of the field of view FV of the focusing lens 26. A subset of the sequence of captured images will define the series of images 42 that include a full or partial image 14' of the target bar code 14. Since only captured images that include at least a portion of an image of the target bar code 14 are useful for decoding the target bar code, captured images not including any portion of the target bar code are ignored.

In one preferred embodiment of the present invention, the bar code reader 10 is a hands-free reader including a generally upright housing 11 having a flat base portion 11b that is adapted to be placed on a counter or tabletop wherein an operator presents the target bar code 14 imprinted on an item or object 15 to the reader 10 for reading, that is, imaging and decoding the target bar code 14. For example, the item 15 may be a driver's license having a 2D bar code 14 imprinted on a surface 15a of the item 15. Preferably, the target bar code 14 is imaged by moving or swiping the surface 15a of the item 15 through the field of view FV of the focusing lens 26 utilizing the item guide 80.

Figure 3:
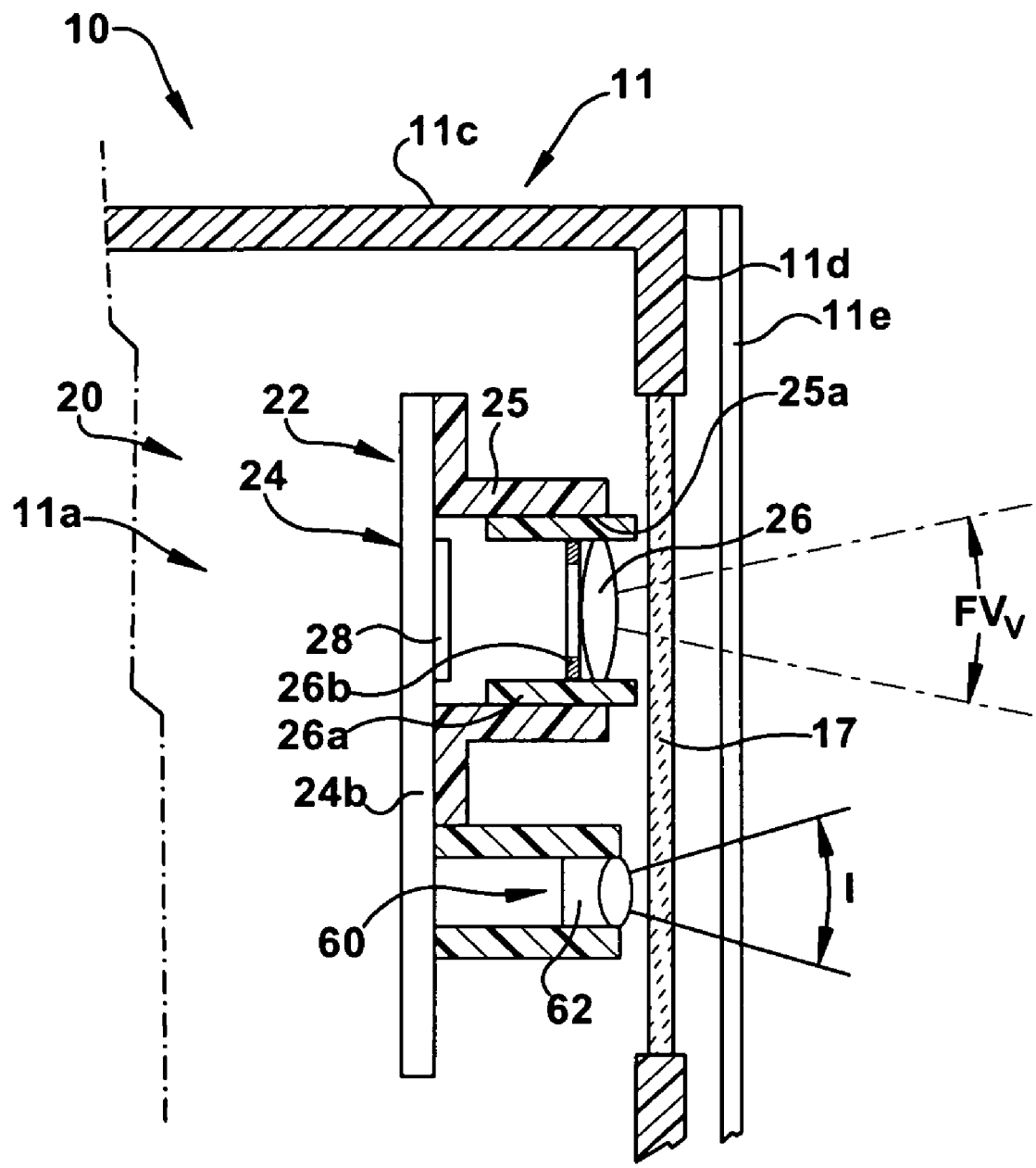
FIG. 3 is a schematic sectional view of a portion of the imaging-based bar code reader of FIG. 1 showing the scanner head.

As is best seen in FIG. 3, the bar code reader housing 11 defines the interior area 11a. Disposed within the interior area 11a is bar code reader circuitry 13 including the imaging and decoding systems 20, 40 and an illumination assembly 60 which, when enabled, directs illumination through the transparent window 17 and onto the target bar code 14. The bar code reader circuitry 13 is electrically coupled to a power supply 16, which may be in the form of an on-board battery or a connected off-board power supply. If powered by an on-board battery, the reader 10 may be a stand-alone, portable unit. If powered by an off-board power supply, the reader 10 may have some or all of the reader's functionality provided by a connected host device.

Circuitry associated with the imaging and decoding systems 20, 40, including the imaging circuitry 24, may be embodied in hardware, software, firmware, electrical circuitry or any combination thereof and may be disposed within, partially within, or external to the camera assembly housing 25. The imaging camera housing 25 is supported with an upper or scanning head portion 11c of the housing and receives reflected illumination from the target bar code 14 through the transparent window 17 supported by the scanning head 11c. The focusing lens 26 is supported by a lens holder 26a. The camera housing 25 defines a front opening 25a that supports and seals against the lens holder 26a so that the only illumination incident upon the sensor array 28 is illumination passing through the focusing lens 26.

Depending on the specifics of the camera assembly 22, the lens holder 26a may slide in and out within the camera housing front opening 25a to allow dual focusing under the control of the imaging circuitry 24 or the lens holder 26a may be fixed with respect to the camera housing 25 in a fixed focus camera assembly. The lens holder 26a is typically made of metal. A back end of the housing 25 may be comprised of a printed circuit board 24b, which forms part of the imaging circuitry 24 and may extend beyond the housing 25 to support the illumination system 60.

The imaging system 20 includes the sensor array 28 which may comprise a charged coupled device (CCD), a complementary metal oxide semiconductor (CMOS), or other imaging pixel array, operating under the control of the imaging circuitry 24. In one exemplary embodiment, the pixel array 28 comprises a two dimensional (2D) mega pixel array with a typical size of the pixel array being on the order of 1280×1024 pixels. The pixel array 28 is secured to the printed circuit board 24b, in parallel direction for stability.

As is best seen in FIG. 3, the focusing lens 26 focuses light reflected from the target bar code 14 through an aperture 26b onto the pixel/photosensor array 28. Thus, the focusing lens 26 focuses an image of the target bar code 14 (assuming it is within the field of view FV) onto the array of pixels comprising the pixel array 28. The focusing lens 26 field of view FV includes both a horizontal and a vertical field of view, the vertical field of view being shown schematically as FVV in FIG. 3.

Figure 4:
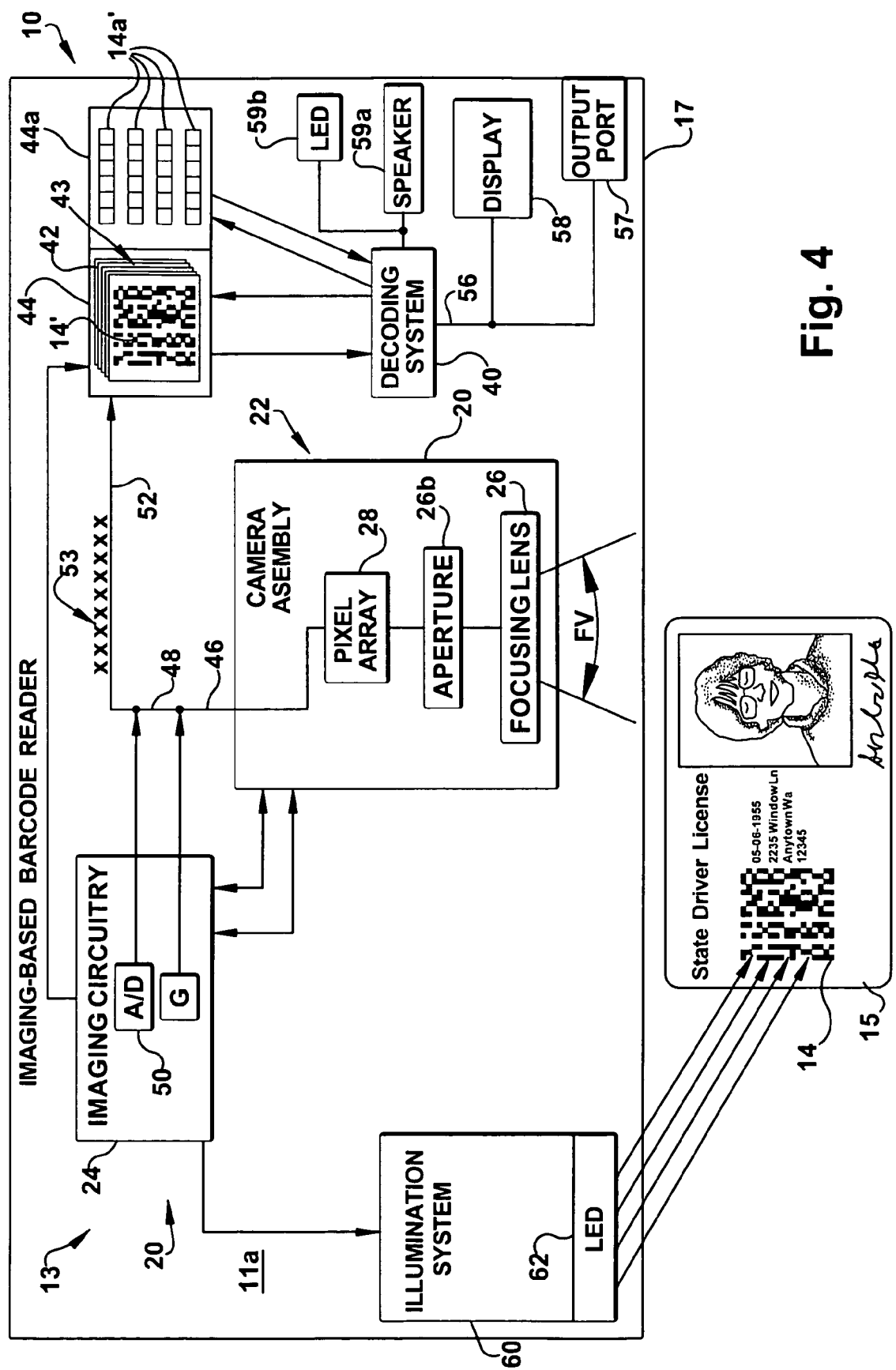
FIG. 4 is a block circuit diagram of the imaging-based bar code reader of FIG. 1.

During an imaging session, multiple images of the field of view FV of the reader 10 are obtained by the imaging system 20. An imaging session may be instituted by an operator, for example, pressing a trigger to institute an imaging session prior to swiping the item 15 through the guide 80. Alternately, the imaging system 20 may institute an imaging session when a lower or bottom edge 15b of the item 15 begin moving through an upper portion of the field of view FV. Yet another alternative is to have the imaging system 30 always operational such that image after image is captured and analyzed for the presence of at least a part or portion of an imaged target bar code 14'. In any event, the process of capturing an image 42 of the field of view FV during an imaging session will be explained in general terms. Electrical signals are generated by reading out of some or all of the pixels of the pixel array 28 after an exposure period. After the exposure time has elapsed, some or all of the pixels of pixel array 28 are successively read out, thereby generating an analog signal 46 (FIG. 4). In some sensors, particularly CMOS sensors, all pixels of the pixel array 28 are not exposed at the same time, thus, reading out of some pixels may coincide in time with an exposure period for some other pixels.

The analog image signal 46 represents a sequence of photosensor voltage values, the magnitude of each value representing an intensity of the reflected light received by a photosensor/pixel during an exposure period. The analog signal 46 is amplified by a gain factor, generating an amplified analog signal 48. The imaging circuitry 24 further includes an analog-to-digital (A/D) converter 50. The amplified analog signal 48 is digitized by the A/D converter 50 generating a digitized signal 52. The digitized signal 52 comprises a sequence of digital gray scale values 53 typically ranging from 0-255 (for an eight bit processor, i.e., $2^8=256$), where a 0 gray scale value would represent an absence of any reflected light received by a pixel (characterized as low pixel brightness) and a 255 gray scale value would represent a very intense level of reflected light received by a pixel during an integration period (characterized as high pixel brightness).

The digitized gray scale values 53 of the digitized signal 52 are stored in the memory 44. The digital values 53 corresponding to a read out of the pixel array 28 constitute the image frame 42, which is representative of the image projected by the focusing lens 26 onto the pixel array 28 during an exposure period. If the field of view FV of the focusing lens 26 includes the target bar code 14, then a digital gray scale value image 14' of the target bar code 14 would be present in the image frame 42.

The decoding circuitry 40 then operates on the digitized gray scale values 53 of the image frame 42 and attempts to decode any decodable part or portion of that image frame 42 that is representative of a part or portion the imaged target bar code 14'. The decoded portions 14a' of the imaged target bar code' are stored in the buffer memory 44a.

Obviously, if a single image frame 42 includes a decodable portion that is representative of or corresponds to the entire imaged target bar code 14' and thereby allows complete decoding of the target bar code in one image frame 42, the decode is complete and a signal for successful decode is generated to activate the speaker 59a and/or LED indicator 59b to let the operator know that decoding of the target bar code 14 has been completed. However with high density bar codes, this will rarely occur because of PPM limitations. Thus, a series of images 43 will need to be obtained, analyzed and partial decodes combined or stitched together utilizing a stitching method to achieve a complete decode.

If the decoding is successful, decoded data 56, representative of the data/information coded in the bar code 14 is then output via a data output port 57 and/or displayed to a user of the reader 10 via a display 58. Upon achieving a good "read" of the bar code 14, that is, the bar code 14 was successfully imaged and decoded, a speaker 59a and/or an indicator LED 59b is activated by the bar code reader circuitry 13 to indicate to the user that the target bar code 14 has successfully read, that is, the target bar code 14 has been successfully imaged and the imaged bar code 14' has been successfully decoded.

The bar code reader 10 further includes the illumination assembly 60 for directing illumination to illuminate the target bar code 14 along the field of view FV. The illumination assembly 60 and the aiming apparatus 70 operate under the control of the imaging circuitry 24. In one preferred embodiment, the illumination assembly 60 is a single LED 62 producing a wide illumination angle to completely illuminate the target bar code 14.

The LED 62 is supported within the scanning head 11b just behind the transparent window 17 and face forwardly, that is, toward the target bar code 14. The LED 62 is positioned away from the focusing lens 26 to increase the illumination angle (shown schematically as I in FIG. 3) produced by the LED 62. Preferably, the illumination provided by the illumination assembly 60 is intermittent or flash illumination as opposed to continuously on illumination to save on power consumption. Also, preferably, the LED 62 is red at the higher end of the red wavelength range, e.g., approximate wavelength around 670 nanometers (nm.)), since red LEDs of this wavelength have been found to provide for efficient conversion of electrons to photons by the LEDs and from photons back to electrons by the photosensor array 28.

Imaging and Decoding Process Utilizing Stitching Method and Item Guide

FIG. 1 illustrates one exemplary embodiment of the guide 80 of the present invention. The guide 80 includes body 81 defining a pair of vertically opposing walls 92. The opposing walls 92 define a pair of inwardly-facing, parallel, vertical side rails 82. Formed in each side rail 82 is a slot 84 that extends a length of respective rail. The slots 84 are substantially parallel to an outer surface 17a of the transparent window 17. Positioned at a downward end of the side rails 82 is a lower stop 86 which bridges the side rails 82. The item guide 80 forces the item 15, when inserted into the slots 84, to be moved along the linear path of travel PT which corresponds to the axis G of the guide and which is parallel the transparent window outer surface 17a. The guide 80 defines a large central opening 87 which is aligned with the window 17 so the item 15 is visible to the window 17 when the item 15 is inserted into the slots 84.

The guide 80 may be affixed to the housing 11 or be a stand-alone component placed in proximity to the housing 11. If affixed to the housing 11, the body 81 may be permanently or releasably affixed to the housing. In the exemplary embodiment shown in FIGS. 1 and 2, the guide body 81 is affixed to the front surface 11d of the upper portion 11c of the housing 11. The front surface 11d of the housing includes two extending arms 11e. The distal ends of the arms 11e slideably engage respective slots 88 in outer surfaces 90 of the opposing vertical walls 92 of the body 81 to secure the body 81 to the housing 11. The body 81 rests on an outward step 11f of the upper portion 11c of the housing 11.

With the bar code reader circuitry 13 energized, the item 15 such that the surface 15a faces the transparent window 17 and the opposite ends 15b of the item 15 are aligned with the parallel slots 84. The item 15 is then swiped or moved downwardly along the path of travel PT such that the target bar code 14 passes in a straight line through the field of view FV of the reader 10. The item 15 is moved downwardly within the slots 84 until a lower edge 15*c* of the item 15 bottoms out on the lower stop 86 of the guide 80. After contacting the lower stop 86, the item 15 is raised upwardly along the path of travel PT, again being constrained by the parallel slots 84 of the rails 82 until the lower edge 15*a* of the item 15 clears the rails 82.

During the time the item 15 is inserted, lowered, raised and removed with respect to the guide 80, the imaging system 20 captures a successive series of images 42 as the item is moved or swiped through the field of view FV of the reader 10. Since the target bar code 14 is imprinted on the item surface 15*a*, at least some of the successive images will include parts or all of the target bar code 14 as the bar code passes through the field of view FV. These images are referred to as the series of captured images 43. Captured images 42 that do not include at least a portion of the imaged target bar code 14' are of no interest and are discarded.

Further, since the target bar code 14 moves in a straight line with respect to the field of view FV, a relative position of the imaged target bar code 14' in each image 42 of the series of images 43 will be linearly aligned with respect to each other and parallel to the movement axis G of the guide 80. This alignment enables the imaged bar code 14' to be more easily located in each image 42 of the series of captured images 43 and facilitates the decoding process since it makes it easier for the decoder system 40 to use a sequence stitching method to properly piece or stitch together a number of partial decodes to obtain a full decode of the target bar code image 14'. Further the side rails 82 are aligned to be substantially parallel to the outer surface 17*a* of the window 17, the target bar code 14 moves in a plane that is substantially parallel to the window at a distance from the focusing lens 26 that provides for a sharp focusing of the target bar code 14 onto the sensor array 28 as the target bar code passes through the field of view FV.

Figure 5A:
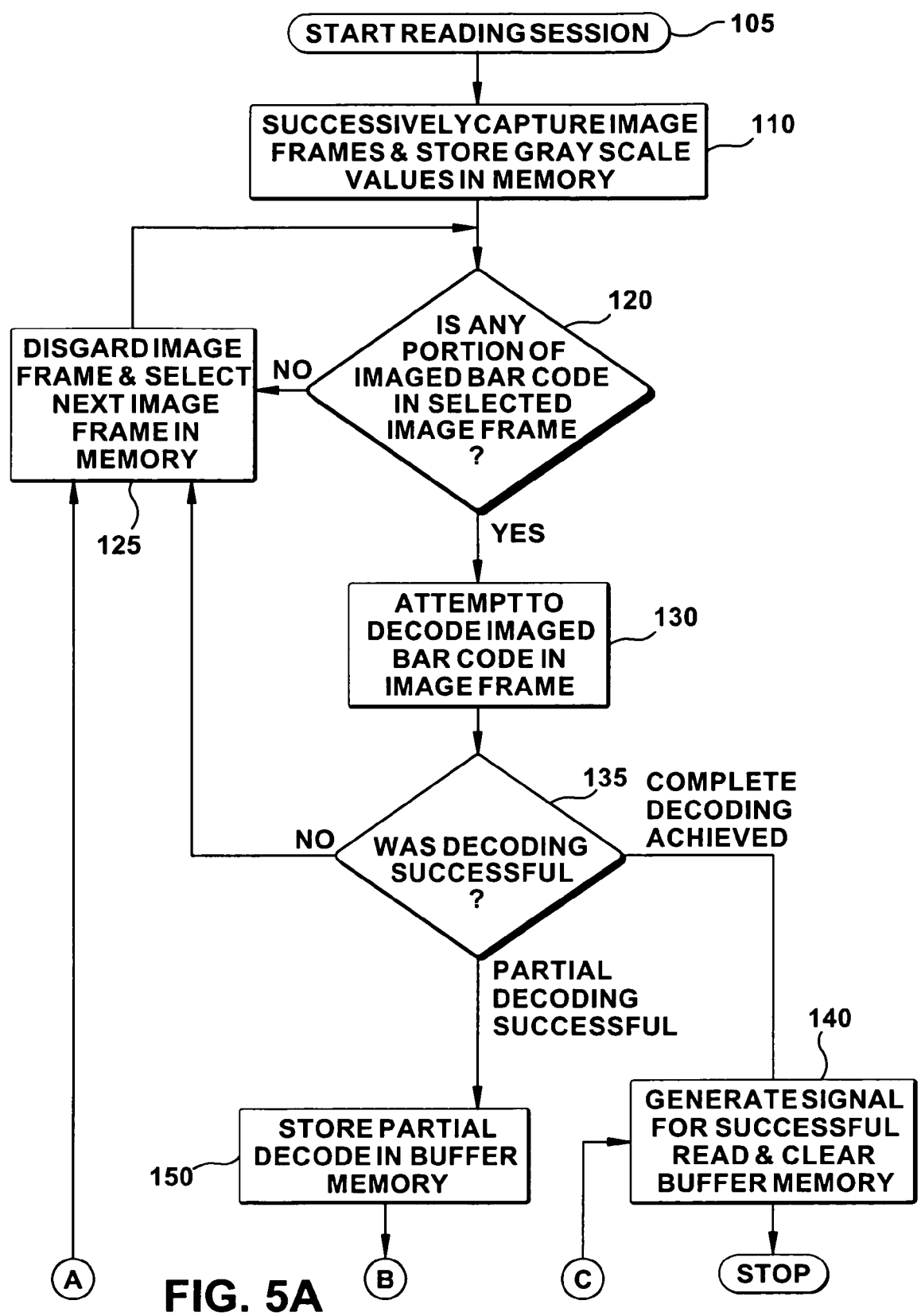
FIG. 5A is an upper portion of a flow chart showing the imaging and decoding process utilized by imaging and decoding systems of the imaging-based bar code reader of FIG. 1.
Figure 5B:
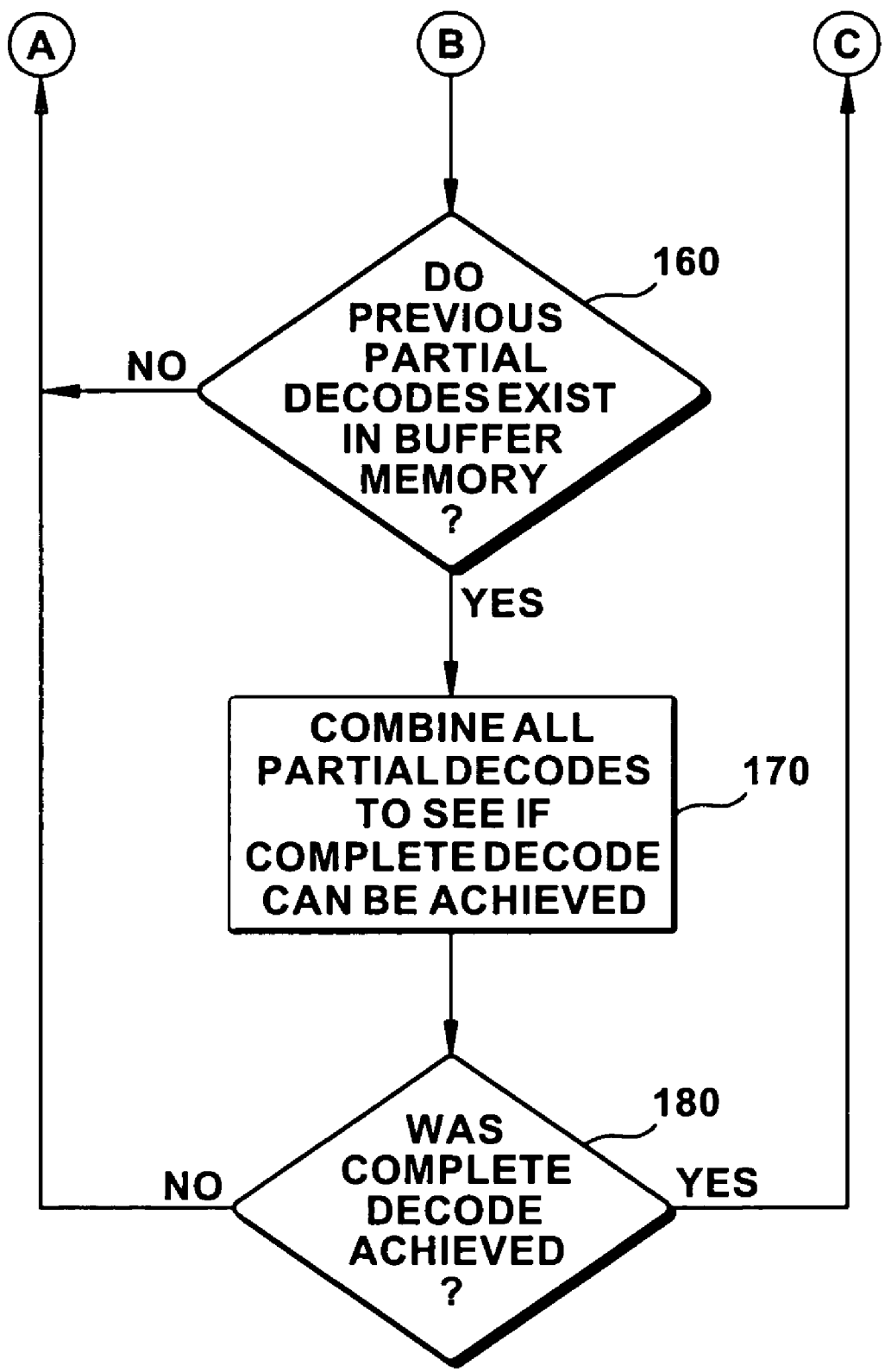
FIG. 5B is a lower portion of the flow chart of FIG. 5A.

The steps of the imaging and decoding process are show generally at 100 in the flow chart of FIG. 5. A reading session is commenced to read the target bar code 14 at 105. At step 110, utilizing the imaging system 10, an image frame 42 is captured by reading out the pixel array 28 after an exposure time to generate the analog signal 46 and the analog signal is digitized and digital gray scale values 53 are generated and stored in memory 44. This process continuously repeats during the entirety of the imaging session storing a sequence of captured images in the memory 44.

At step 120, after the gray scale values 53 of an image frame 42 are stored in memory 44, the decoding system 40 analyzes or operates on the gray scale values 53 to see if any portion of an imaged bar code 14' is present in the image frame 42. If at step 120, the captured image frame 42 analyzed by the decoding system 40 is not found to include any portion of an imaged bar code, at step 125, the image frame is discarded and the process loops back to step 120 wherein the next captured image frame 42 in the sequence of captured image frames is selected and the analysis of step 120 is repeated.

If at step 120, the image frame 42 is found to contain a portion or the entirety of an imaged bar code 14', then, at step 130, the decoding system 40 attempts to decode the imaged bar code 14' or portion of imaged bar code 14' (represented by the gray scale values 53).

If at step 135, the attempted decoding of the imaged bar code 14' or portion of the imaged bar code 14' is determined to be completely unsuccessful, the process loops back to step 125 and then to step 120 wherein the next captured image frame 42 stored in memory 42 is selected and analyzed. If at step 135, the attempted decoding of the imaged bar code 14' is determined to result in a complete, successful decoding of the imaged target bar code 14' in its entirety, then the process is complete and, at step 140, a signal representing a successful read is generated to alert the operator via the speaker 59*a* and/or the LED indicator 59*b*. Also, the buffer memory 44*a* is cleared.

If, at step 135, the attempted decoding of the imaged bar code 14' is determined to be partially successful and a partial decoding of the imaged bar code 14' is achieved, then at step 150, the partial decode 14*a*' is stored in the buffer memory 44*a*. Then, at step 160, the buffer memory 44*a* is operated on by the decoder system 40 to determine if there are any previous partial decodes 14*a*' of the imaged target bar code 14' stored in buffer memory 44*a*. If no other partial decodes 14*a*' are found, then the process returns to step 125 and then to step 120 wherein the next captured image frame 42 is selected and analyzed.

If one or more partial decodes are found, then at step 170, all of the partial decodes 14*a*' found in the buffer memory 44*a* are operated on sought to be combined utilizing a sequence stitching method to see if a successful, complete decode of the imaged bar code 14' can be achieved. At step 180, if a complete decode cannot be achieved, then the process returns to steps 125 and then 120 wherein the next captured image frame 42 in memory 44 is selected. If, at step 180, combining the partial decodes results in a successful, complete decode of the imaged bar code 14', then the process is complete and the process transfers to step 140 where a signal representing a successful read is generated to alert the operator via the speaker 59*a* and/or indicator LED 59*b* that a good read has been achieved.

A bar code sequence stitching method utilizing a buffer memory is disclosed in U.S. Pat. No. 5,821,519, which issued on Oct. 13, 1998 to Lee and Spitz and which is assigned to the assignee of the present invention. The '519 patent is incorporated herein in its entirety by reference. Another reference disclosing sequence stitching methodologies is a book entitled *Algorithms on Strings, Trees, and Sequences: Computer Science and Computational Biology*, by Dan Gusfield, published by the Press Syndicate of the University of Cambridge, Cambridge, England, copyright 1997, ISBN 0-521-58519-8 (hc). The aforementioned book is incorporated herein in its entirety by reference.

One exemplary item guide 80 is shown in FIG. 1 which is especially suitable for small, thin cards, such as driver's licenses, credit cards, identification cards, etc. However, it should be appreciated that depending on the configuration of the item 15 and configuration and position of the target bar code 14 with respect to the item, a wide variety of guides may be utilized as would be understood by one of skill in the art, e.g., a pair of spaced apart L-shaped frames which a box-like item 15 can be slid along, a slit in a structure through which an item 15 is passed, etc. It is the intent of the present invention to cover all such item guides.

While the present invention has been described with a degree of particularity, it is the intent that the invention includes all modifications and alterations from the disclosed design falling within the spirit or scope of the appended claims.

We claim:

1. An imaging-based bar code reader for reading a target bar code affixed to an item, the reader comprising:
    an imaging and decoding system supported within a housing for imaging and decoding the target bar code, the imaging and decoding system including focusing optics and a two dimensional sensor array, the focusing optics defining a two dimensional field of view and focusing reflected illumination from the target bar code onto the sensor array, the housing supporting a transparent window through which the the field of view passes;

an item guide positioned externally of the housing to guide movement of the item such that target bar code passes through the field of view of the focusing optics in a straight line; and wherein the imaging and decoding system:

captures a series of images of the field of view which include at least a part of the target bar code as the target bar code is moved through the field of view of the focusing optics, the field of view being of sufficient size at the item guide to image an entirety of the target bar code;

sequentially analyzes the series of captured images, for each captured image, identifying areas of the captured image representative of an image of the target bar code and decoding decodable portions of the imaged target bar code; and combines the decoded portions of the imaged target bar code obtained from the series of captured images to obtain a full decode of the target bar code.

2. The bar code reader of claim 1 wherein the reader includes a housing supporting the imaging and decoding system and the item guide is affixed to the housing.

3. The bar code reader of claim 2 wherein the item guide includes a pair of parallel rails to guide the item along a straight line path of travel.

4. The bar code reader of claim 3 wherein the pair of parallel rails include longitudinally extending slots which are sized to receive respective end portions of the item to guide the item along the straight line path of travel.

5. The bar code reader of claim 4 wherein the item guide further includes a stop member bridging respective ends of the pair of parallel rails to define an end of the straight line path of travel of the item.

6. The bar code reader of claim 2 wherein the housing supports a transparent window and reflected illumination from the target bar code passes through the window and is received by the focusing optics.

7. The bar code reader of claim 6 wherein a path of travel of the target bar code is substantially parallel to an outer surface of the window as the target bar code passes through the field of view of the focusing optics.

8. The bar code reader of claim 2 wherein the housing includes a flat bottom portion adapted to be positioned on a counter to permit hands-free operation of the reader.

9. The bar code reader of claim 1 wherein the sensor array of the imaging and decoding system is a 2D sensor array.

10. The bar code reader of claim 1 wherein the imaging assembly includes a camera assembly disposed within a camera assembly housing, the camera assembly supporting the focusing optics and the sensor array.

11. The bar code reader of claim 1 further including an illumination system to direct illumination along the field of view of the focusing optics.

12. A method of reading a target bar code comprising:

providing an imaging and decoding system supported within a housing for imaging and decoding the target bar code, the imaging and decoding system including focusing optics and a two dimensional sensor array, the focusing optics defining a two dimensional field of view and focusing reflected illumination from the target bar code onto the sensor array, the housing supporting a transparent window through which the field of view passes;

providing an item guide positioned externally of the housing to guide movement of the item such that target bar code passes through a field of view of the focusing optics in a straight line;

capturing a series of images of the field of view which include at least a part of the target bar code as the target bar code is moved through the field of view of the focusing optics, the field of view being of sufficient size at the item guide to image an entiretly of the target bar code;

sequentially analyzing the series of captured images, for each captured image, identify areas of the captured image representative of an image of the target bar code and decoding decodable portions of the imaged target bar code; and combining the decoded portions of the imaged target bar code obtained from the series of captured images to obtain a full decode of the target bar code.

13. The method of claim 12 wherein imaging and decoding system are supported in a housing and the item guide is affixed to the housing.

14. The method of claim 13 wherein the housing supports a transparent window and reflected illumination from the target bar code passes through the window and is received by the focusing optics.

15. The method of claim 14 wherein a path of travel of the target bar code is substantially parallel to an outer surface of the window as the target bar code passes through the field of view of the focusing optics.

16. The method of claim 13 wherein the housing includes a flat bottom portion adapted to be positioned on a counter.

17. The method of claim 12 wherein the item guide includes a pair of parallel rails to guide the item along a straight line path of travel.

18. The method of claim 17 wherein the pair of parallel rails include longitudinally extending slots which are sized to receive respective end portions of the item to guide the item along the straight line path of travel.

19. The method of claim 18 wherein the item guide further includes a stop member bridging respective ends of the pair of parallel rails to define an end of the straight line path of travel of the item.

20. The method of claim 12 wherein the sensor array of the imaging and decoding system is a 2D sensor array.

21. The method of claim 12 wherein the focusing optics and the sensor array are disposed within a camera assembly housing.

* * * * *

UNITED STATES PATENT AND TRADEMARK OFFICE
CERTIFICATE OF CORRECTION

| | | |
|---|---|---|
| PATENT NO. | : 7,344,080 B2 | Page 1 of 1 |
| APPLICATION NO. | : 11/395569 | |
| DATED | : March 18, 2008 | |
| INVENTOR(S) | : Vinogradov et al. | |

It is certified that error appears in the above-identified patent and that said Letters Patent is hereby corrected as shown below:

ON THE FACE PAGE

On the Face Page, in Field (56), under "OTHER PUBLICATIONS", in Column 2, Line 2, delete "Computional" and insert -- Computational --, therefor.

IN THE DRAWINGS

In Fig. 4, Sheet 4 of 6, for Tag "20", Line 2, delete "ASEMBLY" and insert -- ASSEMBLY --, therefor.

IN THE CLAIMS

In Column 9, Line 5, in Claim 1, after "which" delete "the".

In Column 10, Line 19, in Claim 12, delete "entiretly" and insert -- entirety --, therefor.

Signed and Sealed this

Twenty-fourth Day of November, 2009

David J. Kappos
*Director of the United States Patent and Trademark Office*